(12) United States Patent
Duruoz (10) Patent No.: US 7,382,970 B2
(45) Date of Patent: Jun. 3, 2008

(54) PROCESS CONTROL MANAGER FOR AUDIO/VIDEO FILE SYSTEM

(75) Inventor: Ibrahim Cem Duruoz, San Francisco, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1354 days.

(21) Appl. No.: 10/005,206

(22) Filed: Dec. 3, 2001

(65) Prior Publication Data

US 2002/0165869 A1 Nov. 7, 2002

Related U.S. Application Data

(60) Provisional application No. 60/272,804, filed on Mar. 1, 2001.

(51) Int. Cl.
*H04N 5/91* (2006.01)
(52) U.S. Cl. .......................... 386/96; 386/125
(58) Field of Classification Search .............. 386/46, 386/95, 96, 98, 125, 126, 104; 455/430
See application file for complete search history.

(56) References Cited

U.S. PATENT DOCUMENTS

| | | | | |
|---|---|---|---|---|
| 6,052,588 | A * | 4/2000 | Mo et al. | 455/430 |
| 6,104,876 | A * | 8/2000 | Daum et al. | 710/37 |
| 6,370,323 | B1 * | 4/2002 | Adolph et al. | 386/104 |

* cited by examiner

Primary Examiner—Huy Nguyen
(74) Attorney, Agent, or Firm—Trellis Intellectual Property Law Group, PC (57) ABSTRACT

A system and method for managing file system processes is provided. In an exemplary embodiment, the system includes a global process module to handle and monitor the file system processes within a file system. The global process module includes a process status monitor, a pointers control, process size indicator, and a number of local process objects. The process status monitor is used to maintain and monitor information pertaining to the status of file system processes running on the file system. The pointers control is used to point to the various local process objects. The process size indicator is used to maintain an inventory of size information for each file system process. Each local process object is associated with a file system process. Each local process object further includes a progress monitor, a callback function, a process phase monitor, and a set of application specific process properties. The progress monitor is used to monitor the state of a particular process. Process states include an inactive state, a first-call state, a going-on state, and a last-call state. The callback function is used to provide a way to signify the completion of a particular process. The process phase monitor is used to monitor the various phases, if any, of a state of a particular process. Finally, the set of application specific process properties are parameters which are associated with each particular process. In an exemplary embodiment, the global process module handles and monitors the file system processes in accordance with a process management method. The process management method uses the state of a particular process to facilitate its execution.

19 Claims, 4 Drawing Sheets

PROCESS CONTROL MANAGER FOR AUDIO/VIDEO FILE SYSTEM

CROSS-REFERENCES TO RELATED APPLICATIONS

The present application claims the benefit of priority under 35 U.S.C. § 119 from U.S. Provisional Patent Application Ser. No. 60/272,804, entitled "PROCESS CONTROL MANAGER FOR AUDIO/VIDEO SYSTEM," filed on Mar. 1, 2001, the disclosure of which is hereby incorporated by reference in its entirety for all purposes.

The present application is related to the following co-pending, commonly assigned applications including: U.S. Provisional Patent Application Ser. No. 60/272,798, entitled "APPLICATION PROGRAMMING INTERFACE FOR COMMUNICATION BETWEEN AUDIO/VIDEO FILE SYSTEM AND HARD DISK DRIVE SOFTWARE" by Duruoz et al., filed on Mar. 1, 2001; U.S. patent application Ser. No. 10/005204 entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz et al., filed concurrently herewith, which claims the benefits of priority from U.S. Provisional Patent Application Ser. No. 60/272,846, entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz, filed on Mar. 1, 2001; and U.S. patent application Ser. No. 60/272863 entitled "APPLICATION PROGRAMMING INTERFACE FOR COMMUNICATION BETWEEN ADUIO/VIDEO FILE SYSTEM AND AUDIO/VIDEO CONTROLLER" by Duruoz et al., filed concurrently herewith, which claims the benefit of priority from U.S. Provisional Patent Application Ser. No. 60/272,863, entitled "APPLICATION PROGRAMMING INTERFACE FOR COMMUNICATION BETWEEN ADUIO/VIDEO FILE SYSTEM AND AUDIO/VIDEO CONTROLLER" by Duruoz et al., filed on Mar. 1, 2001, all of which are incorporated in their entirety by reference herein.

BACKGROUND OF THE INVENTION

Digital audio/video (A/V) input/output (I/O) devices are employed in various demanding applications including motion picture, video game console, Internet appliance, and PC multimedia applications. Such applications often require transfer of A/V data and commands between A/V I/O devices and associated A/V systems.

Typically, an A/V system includes an A/V controller, an A/V file system, and a physical storage driver. An A/V I/O device, such as a camcorder, generally communicates with the A/V controller to forward to the A/V controller the desired A/V commands to be executed. Upon receiving the A/V commands, the A/V controller then directs the A/V file system to act accordingly. The communication between the A/V controller and the A/V file system can be, for example, implemented using an application programming interface. An example of such application programming interface is disclosed in co-pending U.S. patent application Ser. No. 10/005884, entitled "APPLICATION PROGRAMMING INTERFACE FOR COMMUNICATION BETWEEN AUDIO/VIDEO FILE SYSTEM AND AUDIO/VIDEO CONTROLLER," filed concurrently herewith, which claims the benefit of priority from U.S. Provisional Patent Application Ser. No. 60/272,863, entitled "APPLICATION PROGRAMMING INTERFACE FOR COMMUNICATION BETWEEN ADUIO/VIDEO FILE SYSTEM AND AUDIO/VIDEO CONTROLLER" by Duruoz et al., filed on Mar. 1, 2001, the disclosures of which are incorporated in their entirety by reference herein.

In accordance with the desired A/V commands received from the A/V controller, the A/V file system then, in turn, directs the physical storage driver to process the necessary A/V data. For example, the physical storage driver may output certain A/V data to the A/V I/O device for display, or alternately, it may record A/V data received from the A/V I/O device. Similarly, the communication between the A/V file system and the physical storage driver can also be implemented using an application programming interface. An example of such application programming interface is disclosed in co-pending U.S. Provisional Patent Application Ser. No. 60/272,798, entitled "APPLICATION PROGRAMMING INTERFACE FOR COMMUNICATION BETWEEN AUDIO/VIDEO FILE SYSTEM AND HARD DISK DRIVE SOFTWARE" by Duruoz et al., filed on Mar. 1, 2001. Since the A/V file system is required to communicate with both the A/V controller and the physical storage driver, it would be desirable to provide an A/V file system that is capable of optimizing communications with other devices.

Furthermore, A/V files typically comprise sequential time-dependent data frames. Time-dependent files, such as A/V files, are generally called isochronous files. These isochronous files are usually very large. On the other hand, non time-dependent files, such as word processor and spreadsheet files, are generally called asynchronous files and they are relatively small. Both types of files, isochronous and asynchronous, are usually stored on the same physical storage medium, such as a hard disk.

As mentioned above, the A/V file system communicates with the physical storage driver to control data access and handling. Consequently, the A/V file system is often required to accommodate large A/V files and small asynchronous files on the same disk. Unfortunately, existing file systems are typically optimized to handle only either A/V files or small asynchronous files, but not both. File systems optimized for small asynchronous files are often susceptible to A/V data corruption or glitches in A/V playback resulting from unexpected data retrieval delays. On the other hand, file systems optimized for A/V data often inefficiently handle small asynchronous files.

Hard disks and accompanying file systems used for A/V applications are often optimized for small asynchronous files. These file systems often only support either file allocation table (FAT) or FAT disks. Each FAT corresponds to a given disk. The given disk is generally divided into clusters or blocks. A FAT contains a number of indices. Each FAT index corresponds to a cluster or block within the given disk. Since a cluster or block is the smallest addressable unit within the given disk, a file may occupy a hard disk cluster specified by a FAT index even if the file size is much smaller than the cluster size. The difference between the cluster size and the file size represents wasted space. Consequently, these fixed FAT's may cause inefficient disk memory allocation, especially in file systems employed for both small and large files.

Generally, a file system facilitates file organization, creation, deletion, saving, and updating. File systems often employ file system operating systems and associated directory structures to facilitate file system operations. To avoid A/V playback glitches, file system operating systems must coordinate file access and retrieval operations to accommodate delays between code or command execution and disk access. For example, if a file system is directed to execute a playback operation, a delay exists between the execution of the playback command and data retrieval from the disk. This delay need to be effectively accommodated to avoid A/V playback glitches or data corruption.

Furthermore, many A/V I/O devices, such as camcorders, communicate with A/V systems via IEEE 1394 serial links. Such serial links may place additional time constraints on A/V disk access and retrieval operations. Conventional file systems that are optimized for asynchronous files may not effectively meet the time constraints, resulting in data corruption or glitches in the A/V playback.

As A/V technology advances, file sizes increase with the resolution of A/V data. The larger files create further delays between command execution and disk access, which may exacerbate glitches in A/V data streams handled by conventional file systems and associated operating systems. File system technology, therefore, need to keep up with improving A/V technology to maintain efficient file system operation. Hence, it would be desirable to provide an A/V file system that is capable of efficiently handling both asynchronous and isochronous files thereby minimizing delays between command execution and disk access.

SUMMARY OF THE INVENTION

The present invention generally relates to file systems. More specifically, the present invention relates to a process control manager for an audio/video file system for facilitating and optimizing audio/video operations.

In an exemplary embodiment, the system of the present invention includes a global process module to handle and monitor the file system processes within a file system. The file system processes include, for example, interface functions between an audio/video controller (AVC) and the file system and interface functions between a hard disk driver and the file system. The file system processes further include file allocation functions, file descriptor allocation functions, and interface functions between an SBP-2 controller and the file system. The global process module includes a process status monitor, a pointers control, process size indicator, and a number of local process objects.

The process status monitor is used to maintain and monitor information pertaining to the status of file system processes running on the file system. The pointers control is used to point to the various local process objects. The process size indicator is used to maintain an inventory of size information for each file system process. Each local process object is associated with a file system process.

Each local process object further includes a progress monitor, a callback function, a process phase monitor, and a set of application specific process properties. The progress monitor is used to monitor the state of a particular process. Process states include an inactive state, a first-call state, a going-on state, and a last-call state. The callback function is used to provide a way to signify the completion of a particular process. The process phase monitor is used to monitor the various phases, if any, of a state of a particular process. Finally, the set of application specific process properties are parameters which are associated with each particular process.

In an exemplary embodiment, the global process module handles and monitors the file system processes in accordance with a process management method. The process management method uses the state of a particular process to facilitate its execution.

More specifically, the process management method tracks the status of each active process and utilizes the status to control process flow. By tracking the status of each file system process, the processes may be selectively paused while external functions and/or processes are called upon by the current process to return additional requisite values. This facilitates accommodation of delays between disk access and code execution, which are inherent during large isochronous file operations, and also allows for more efficient accommodation of asynchronous file operations.

Furthermore, many different processes may run simultaneously or in a nested manner thereby allowing different file allocation processes to efficiently and simultaneously use hard disk space for both large and small files. The present invention supports efficient allocation disk space for both large and small files while ensuring that isochronous file time constraints are met.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DETAILED DESCRIPTION OF THE INVENTION

Figure 1:
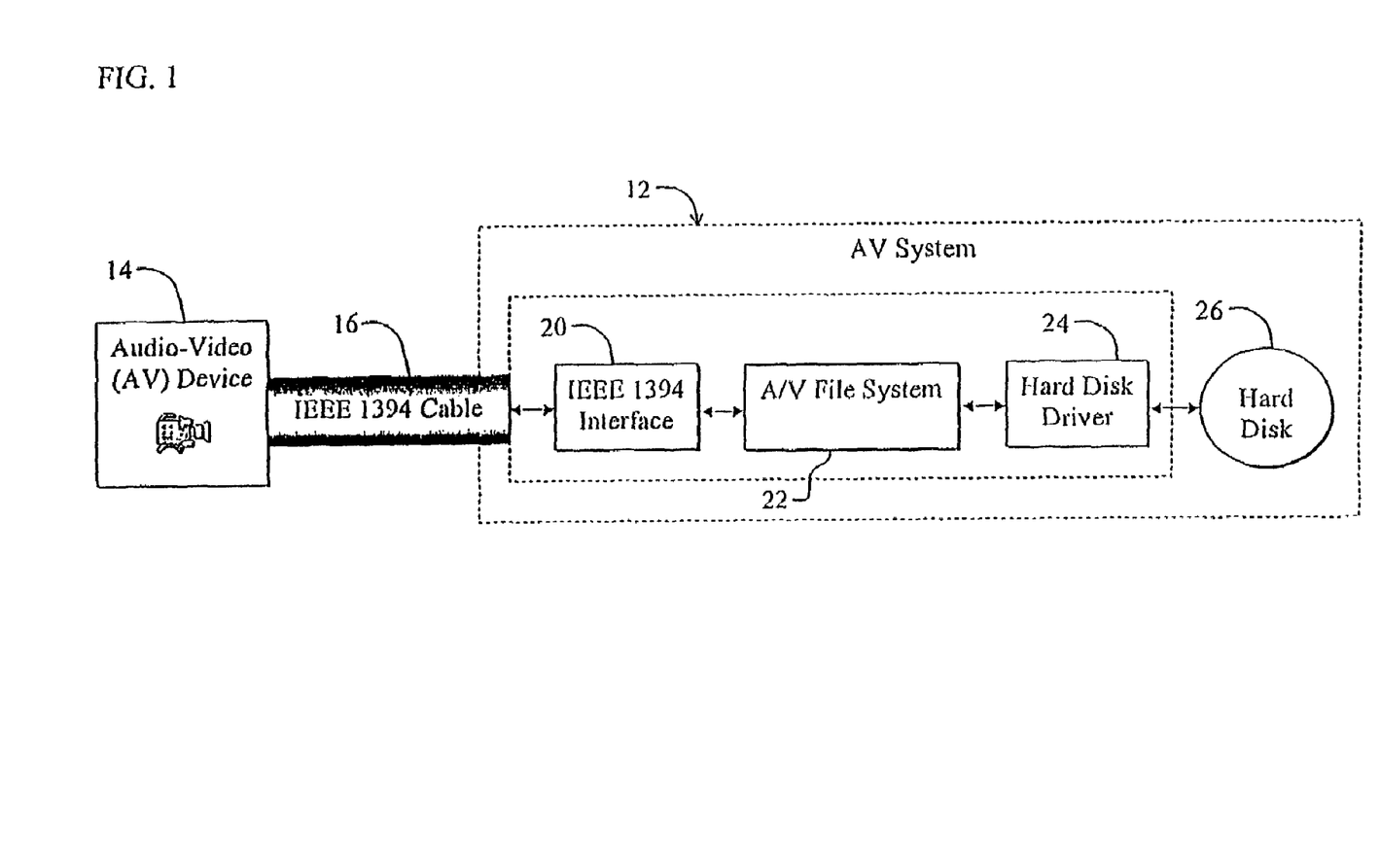
FIG. 1 is a simplified functional block diagram showing a first embodiment of the present invention.

Exemplary embodiments of the present invention will now be described. FIG. 1 is a simplified functional block diagram of an exemplary embodiment of the present invention. This exemplary embodiment includes an A/V I/O device 14, an A/V system 12, and an IEEE 1394 cable 16 which is used to transfer A/V commands between the A/V I/O device 14 and the A/V system 12.

The A/V system 12 further includes an IEEE 1394 interface 20, an A/V file system 22, a hard disk driver 24, and a hard disk 26. As shown in FIG. 1, the IEEE 1394 interface 20 communicates with the IEEE 1394 cable 16 to facilitate transfer of A/V commands between the A/V I/O device 14 and the A/V system 12. The IEEE 1394 interface 20 then accordingly communicates the A/V commands to the A/V file system 22. The A/V file system 22, in turn, effectuates the desired A/V operations pursuant to the received A/V commands via the hard disk driver 24. The hard disk driver 24 communicates with the hard disk 26 to carry out the necessary data operations.

For clarity, it should be understood that, in an exemplary embodiment, portions of the IEEE 1394 interface 20, the A/V file system 22 and the hard disk driver 24 are implemented via software. Such software, or portions thereof, may be stored on the hard disk 26.

While the present invention is described with reference to the A/V I/O device 14 and the IEEE 1394 cable 16, those skilled in the art will appreciate that other types of devices and communications links may be employed, or the A/V I/O device 14 and cable 16 may be omitted, without departing from the scope of the present invention. For example, the A/V I/O device 14 may be replaced with another type of device, such as a TV set-top box, a video game console, a digital video disk player, an Internet appliance, a scanner, a printer, or other device. Another type of communication link, such as a Universal Serial Bus (USB), may be employed instead of the IEEE 1394 cable 16.

Furthermore, those skilled in the art will also appreciate that other types of physical storage devices in addition to hard disks may be employed in accordance with the principles of the present invention.

In operation, A/V data or commands are sent to the A/V system 12 over the IEEE 1394 cable 16. The IEEE 1394 interface 20 interprets the protocol employed by the A/V I/O device 14 for data or command transfer over the cable 16 and accordingly prepares the received data or commands for execution by the A/V file system 22. The A/V file system 22 employs various functions that operate within the framework of a process management method to selectively and appropriately handle commands and data issued by the A/V I/O device 14 and received via IEEE 1394 interface 20, as described more fully below. Exemplary commands include writing to the hard disk 26 via the hard disk driver 24, recording A/V data to the hard disk 26, playing A/V data, pausing playback, resuming playback, retrieving file descriptor information from the hard disk 26, deleting file descriptor information, and so on.

As will be more fully described below, the A/V file system 22 utilizes a process management method which facilitates proper sequencing and execution of file system processes and helps accommodate delays between command execution and disk access which may be caused by isochronous files. The process management method also supports the use of file allocators and descriptor allocators that enable more efficient use of hard disk space for both large and small file sizes.

Figure 2:
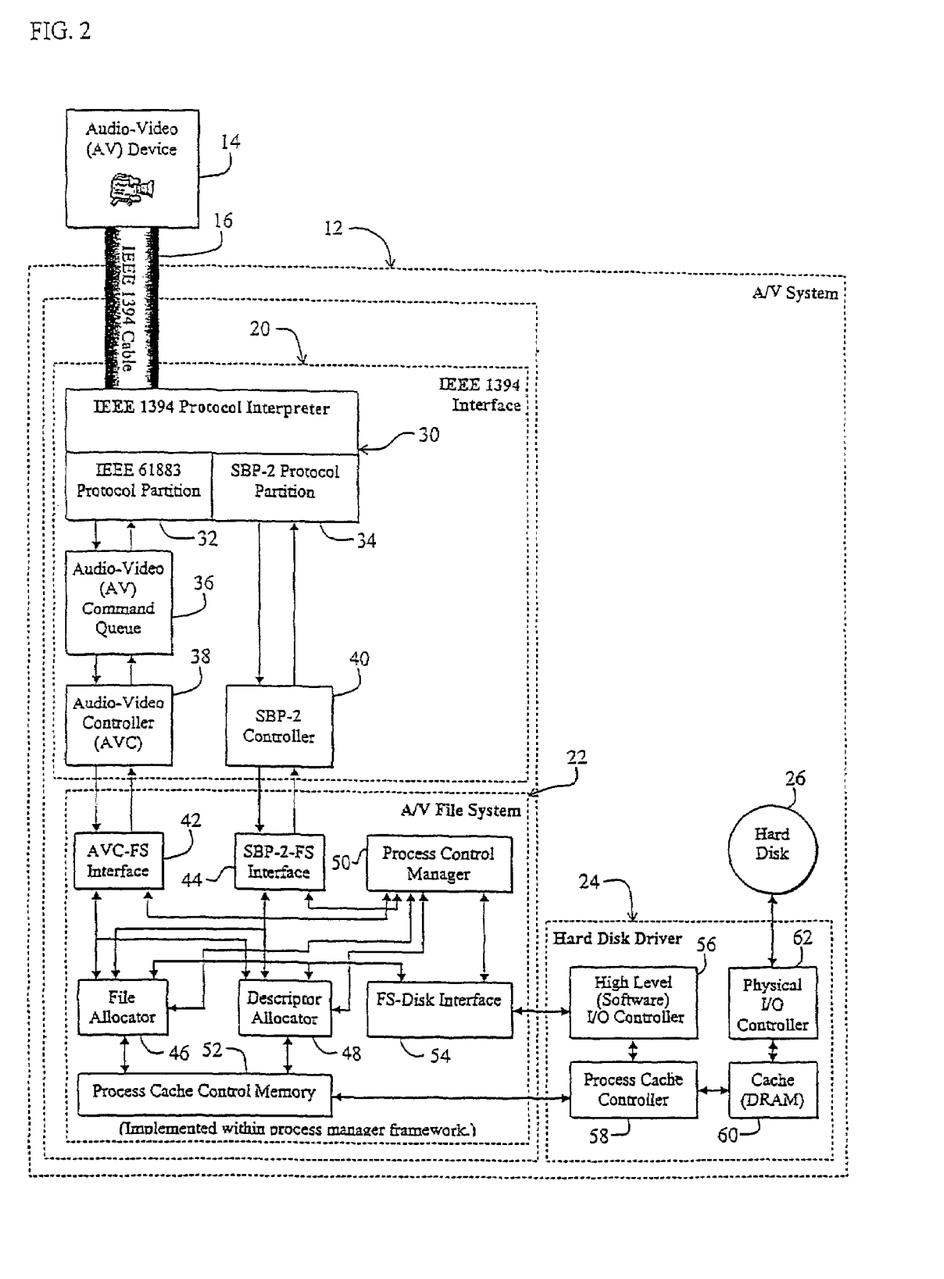
FIG. 2 is a simplified functional block diagram showing a second embodiment of the present invention.

FIG. 2 is a simplified functional block diagram showing a second embodiment of the present invention. For clarity, various components, such as clocking circuitry, power supplies, and amplifiers are not shown in FIG. 2. However, based on the disclosure and teachings provided herein, one skilled in the art will know how to implement the additional components.

As shown in FIG. 2, the IEEE 1394 interface 20 includes an IEEE 1394 protocol interpreter 30, an A/V command queue 36, an A/V controller 38 and a SBP-2 controller 40. The IEEE 1394 protocol interpreter 30 further includes an IEEE 61883 protocol partition 32 and a serial-bus-protocol (SBP-2) partition 34.

The A/V I/O device 14 is connected to the IEEE 1394 protocol interpreter 30 via the IEEE 1394 cable 16. The IEEE 61883 protocol partition 32 is connected to the A/V command queue 36 which communicates with the A/V controller 38. The SBP-2 protocol partition 34 communicates with the SBP-2 controller 40.

The A/V file system 22 includes an AVC-FS interface 42 and an SBP-2-FS interface 44, which communicate with the A/V controller 38 and the SBP-2 controller 40, respectively. The AVC-FS interface 42 and the SBP-2-FS interface 44 communicate with an file allocator 46 and a descriptor allocator 48 in coordination with a process control manager 50. The file allocator 46 and the descriptor allocator 48 communicate with a process cache control memory 52 and a FS-disk interface 54 in coordination with the process control manager 50.

In a preferred embodiment, the A/V file system 22 is implemented in software stored on the hard disk 26 and running from Random Access Memory (RAM) (not shown). However, it should be understood that one skilled in the art will appreciate that the A/V file system 22 may be implemented in hardware without departing from the scope of the present invention.

The hard disk driver 24 includes a high-level (software) input/output (I/O) controller 56 and a process cache controller 58, which intercommunicate and also communicate with the FS-disk interface 54 and the process cache control memory 52, respectively. The process cache controller 58 communicates with a cache 60, which is implemented, for example, as a dynamic random access memory (DRAM) in the present specific embodiment. The cache 60 communicates with a physical I/O controller 62 which selectively accesses hard disk cylinders of the hard disk 26.

It should be understood that the hard disk driver 24 may be developed by one skilled in the art based on the disclosure provided herein. Alternatively, the hard disk driver 24 and the associated hard disk 26 may be purchased from a number of hard disk vendors, such as Western Digital Corp.

In operation, the A/V I/O device 14 sends a signal comprising commands and/or data to the IEEE 1394 protocol interpreter 30 via the IEEE 1394 cable 16. The protocol interpreter 30 determines the protocol of the received signal and selectively routes the signal to the IEEE 61883 protocol partition 32 or the SB-2 Protocol partition 34. If the received signal is an IEEE 61883 protocol signal, then the signal is processed by the 61883 protocol partition 32 to generate a signal suitable for handling by the A/V controller 38. The resulting processed signal is forwarded to the A/V command queue 36 to await execution by the A/V controller 38. The A/V command queue 36 maintains a sequence of commands and/or data which are generally processed sequentially by the A/V controller 38.

Similarly, if the signal received by the protocol interpreter 30 via the IEEE 1394 cable 16 is an SBP-2 protocol signal, then the SBP-2 protocol partition 34 processes the signal to render it suitable for handling by the SBP-2 controller 40. Further operation and construction details of the IEEE 1394 interface are available in the IEEE 1394 specification. The SBP-2 controller 40 may optionally communicate with the physical I/O controller 62 of the hard disk driver 24.

The A/V controller 38 is responsible for responding to commands and/or data received from the A/V command queue 36 and accordingly invoking the A/V file system 22 to have various functions and/or processes performed. For clarification purposes, a function may implement a process; a process may employ several functions; and a function does not always represent a process. A process is a set of instructions implemented in accordance with the process management method of the present invention as discussed more fully below.

The A/V controller 38 handles incoming commands issued by the A/V I/O device 14 and processes these commands so that such commands can be communicated to the A/V file system 22. This facilitates file and directory creation and retrieval by the A/V file system 22. Communication between the A/V file system 22 and the A/V controller 38 is facilitated by the AVC-FS interface 42.

The AVC-FS interface 42 communicates with the A/V controller 38 to receive commands from the A/V controller 38. The commands are then accordingly processed by the A/V file system 22 to perform a number of functions and/or processes. Functions and/or processes that the A/V file system 22 may be invoked to perform include, for example, retrieving file descriptor information, storing file descriptor information, deleting file descriptor information, obtaining a current logic block address for a file or other segment of data, checking the validity of the hard disk object or list identification associated with the file, and playing, recording, stopping, resuming, and pausing an A/V file. The AVC-FS interface 42 may direct the A/V file system 22 to perform more, fewer, or different functions than the ones listed above without departing from the spirit or scope of the present invention.

In a preferred embodiment, the communication between the A/V controller 38 and the AVC-FS interface 42 is implemented via an application programming interface having a number of function calls. An example of such application programming interface is described more fully in co-pending U.S. patent application Ser. No. 10/005884 entitled "APPLICATION PROGRAMMING INTERFACE FOR COMMUNICATION BETWEEN ADUIO/VIDEO FILE SYSTEM AND AUDIO/VIDEO CONTROLLER" by Duruoz et al., filed concurrently herewith, which claims the benefit of priority from U.S. Provisional Patent Application Ser. No. 60/272,863, entitled "APPLICATION PROGRAMMING INTERFACE FOR COMMUNICATION BETWEEN ADUIO/VIDEO FILE SYSTEM AND AUDIO/VIDEO CONTROLLER" by Duruoz et al., filed on Mar. 1, 2001, the disclosures of which are incorporated herein by reference.

Each function call of the application programming interface generally returns results, such as acknowledgments and function return values, to the A/V controller 38 which then employs the results to selectively handle the data and/or commands received from the A/V command queue 36. For example, if object identification or list identification values received by the AVC-FS interface 42 from the A/V controller 38 for a particular operation are invalid, then the A/V file system 22 creates a valid identification value and a corresponding valid descriptor and returns the valid identification value to the A/V controller 38 via a callback function specified in the command sent by the A/V controller 38. The A/V file system 22 then causes the newly created data to be stored onto the hard disk 26 using the file allocator 46 and/or descriptor allocator 48 via the FS-disk interface 54.

Various function calls of the application programming interface received and interpreted by the AVC-FS interface 42 represent processes to implemented or executed by the A/V file system 22. In order to implement a process, the process control manager 50 is invoked.

The process control manager 50 includes a global process module that maintains current information pertaining to all processes running on the A/V file system 22. The global process module includes a number of local process modules, each of which is employed to track the status of an individual process. The global process module and the local process modules are regularly updated in accordance with the process management method as discussed more fully below.

The construction and operation of the SBP-2-FS interface 44 is similar to the AVC-FS interface 42 with the exception of minor modifications required to accommodate SBP-2 commands. The requisite modifications may be determined and implemented by one of ordinary skill in the art without undue experimentation. The SBP-2 controller 40 may optionally communicate directly with the physical I/O controller 62.

Similarly, the A/V file system 22 communicates with the hard disk driver 24. The hard disk driver 24, in turn, directs the hard disk 26 to provide the necessary data and/or resources to carry out the intended data operations to satisfy any asynchronous and isochronous transactions. Examples of asynchronous transactions include saving descriptors to disk, retrieving descriptors, reading the file allocation table from the disk 26, and so on. Examples of isochronous transactions include starting playback, recording, and passing logical block addresses (LBA) to the disk 26. More specifically, the communication between the A/V file system 22 and the hard disk driver 24 is achieved via the FS-disk interface 54 and the high-level (software) I/O controller 56.

In a preferred embodiment, the communication between the A/V file system 22 and the hard disk driver 24 is also implemented via an application programming interface having a number of function calls. An example of such application programming interface is described more fully in co-pending U.S. Provisional Patent Application Ser. No. 60/272,798, entitled "APPLICATION PROGRAMMING INTERFACE FOR COMMUNICATION BETWEEN AUDIO/VIDEO FILE SYSTEM AND HARD DISK DRIVE SOFTWARE" by Duruoz et al., filed on Mar. 1, 2001, the disclosure of which is incorporated herein by reference.

The application programming interface utilized by the FS-disk interface 54 and the high-level (software) I/O controller 56 to interface with one another includes a number of function calls. Each function call generally represents one or more processes which are to be executed to achieve the function intended by the function call. A function call can be invoked by the A/V file system 22 to direct one or more processes to be executed by the hard disk driver 24. For example, function calls relating to record, pause and play can be invoked by the A/V file system 22 to cause the hard disk driver 24 to supply the necessary data and/or resources to carry out the intended operations. Likewise, a function call can be invoked by the hard disk driver 24 via the high-level (software) I/O controller 56 to direct one or more processes to be executed by the A/V file system 22. Typically, the process(es) which are needed to satisfy the invoked function call are implemented on the side which receives the invoked function call.

Exemplary processes that may be invoked and executed include asynchronous file operations such as allocating memory space within the cache 60, deallocating the cache 60, retrieving buffer access pointers associated with the current file, passing cache data to the A/V file system 22, storing cache data to the hard disk 26, and retrieving data from the hard disk 26 into the cache 60 via read or write commands implemented by the high-level (software) I/O controller 56 of the hard disk driver 24.

Additional processes that may be invoked and executed also include isochronous file operations such as recording, playing, pausing, stopping, resuming, which are invoked by the A/V file system 22 and executed by the hard disk driver 24, and recording more, and playing more, which are invoked by the hard disk driver 24 and executed by the A/V file system 22.

The hard disk 26 is logically accessible from a number of components. Functions and/or processes may selectively access the hard disk 26 via the file allocator 46, the descriptor allocator 48, the process cache control memory 52, the process cache controller 58, the cache 60 and the physical I/O controller 62. Alternatively, functions and/or processes may also access the hard disk 26 via the high-level (software) I/O controller 56, the process cache controller 58, the cache 60, and the physical I/O controller 62.

The file allocator 46 implements processes to manage hard disk space. The processes include allocating empty spaces on the hard disk 26 and maintaining a record of which hard disk spaces are used.

In a preferred embodiment, the file allocator 46 uses certain hierarchical file allocation tables and other tables, such as a contiguous space table, a track table and a list table, to facilitate data storage and retrieval within a hard disk.

The file allocator 46 employs two or more types of hierarchical file allocation tables (HFATs) (not shown) to store both small files, such as asynchronous text files, and large files, such as isochronous A/V files. In a preferred embodiment, the HFATs include a 0th order HFAT and a 1st order HFAT. Each entry in the 0th order HFAT is mapped to a disk block. A disk block may be further subdivided into subdivisions. Each entry in the 1st order HFAT is mapped to a subdivision within a disk block. Furthermore, each subdivision may also be further subdivided into subunits. Each subunit is then referenced by an entry in a 2nd order HFAT. Each entry in the 0th order HFAT includes information, such as space availability, about any subdivisions or subunits (and their associated 1st order HFAT and 2nd order HFAT, respectively) that may be contained within the disk block referenced by that entry.

Since a subdivision is smaller than a disk block, subdivisions are used for storing smaller files, while the larger disk blocks are used for larger files. For example, the subdivisions may be employed for A/V file descriptors, while the disk blocks may be employed for the A/V file itself. This reduces wasted space associated with conventional fixed-FAT hard disks. The process control method, as will be described further below, which is used by the process control manager to control each process within the A/V file system 22, facilitates use of the HFATs to efficiently store files on the hard disk 26.

The file allocator 46 also employs a contiguous space table (CST) (not shown), which maintains sizes of contiguous spaces on the hard disk 26. CST table entries include the number of contiguous empty sectors associated with each HFAT index. This enables the file allocator 46 to monitor and swiftly locate contiguous spaces within the hard disk for storing A/V files. By storing A/V files in contiguous spaces, file access time is reduced, which results in fewer A/V playback glitches.

The descriptor allocator 48 manages a track table and a list table (not shown). The track table and the list table are instances of hash tables and maintain basic information about A/V tracks and descriptors stored on the hard disk 26. Track table information may include track identifications, track sizes, descriptor sizes, and so on. List table information may include list identifications, list sizes, list starting locations, and so on.

The HFATs and other tables, such as the contiguous table, the track table and the list table, are more fully described in co-pending U.S. patent application Ser. No. 10/005204 entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz, filed concurrently herewith, which claims the benefits of priority from U.S. Provisional Patent Application Ser. No. 60/272,846, entitled "METHOD AND SYSTEM FOR OPTIMIZING DATA STORAGE AND RETRIEVAL BY AN AUDIO/VIDEO FILE SYSTEM USING HIERARCHICAL FILE ALLOCATION AND OTHER TABLES" by Duruoz, filed on Mar. 1, 2001, the disclosures of which are incorporated herein by reference.

The file and descriptor allocators 46 and 48 also maintain error logs in ring buffers (not shown) on the hard disk 26 that store commands originating from the AV controller 38 in addition to the most recent disk storage operation. The error logs are stored on the hard disk 26 before any other disk storage operations are performed during command execution so that the most recent transactions may be recalled in case of a power failure or other interruption. Furthermore, the error log facilitates detecting and repairing any inconsistencies occurring in the A/V file system 22.

The file allocator 46 and descriptor allocator 48 call various cache control functions which are stored in the cache control memory 52 in order to control hard disk space allocation. For example, the process cache control memory 52 may include disk write and read functions that receive logic block addresses (LBA) as input from the allocators 46 and 48 and write and read to the disk 26 via the process cache controller 58, the cache 60, and the physical I/O controller 62.

Processes running on the A/V file system 22, including processes implemented by the file allocator 46 and the descriptor allocator 48, are controlled and monitored by the process control manager 50 in accordance with a process management method or framework that sequences and/or coordinates the processes in an efficient manner. The process control manager 50 and the associated process management method allow the A/V file system processes to run in parallel or in a nested manner, as discussed more fully below.

Figure 3:
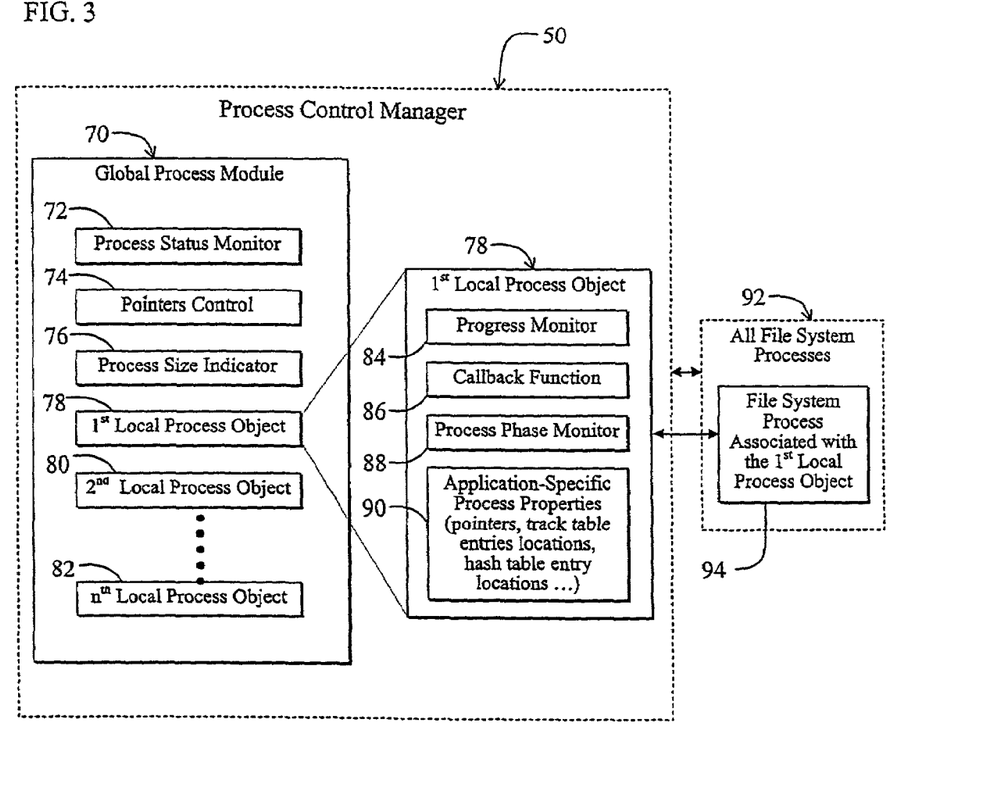
FIG. 3 is a simplified schematic diagram showing one embodiment of the process control manager in accordance with the present invention.

FIG. 3 is a simplified schematic diagram showing one embodiment of the process control manager 50 in accordance with the present invention. The process control manager 50 includes a global process module 70. The global process module 70 includes a process status monitor 72, pointers control 74, process size indicator 76, and a number of local process objects including, for example, a first local process object 78, a second local process object 80, and an nth local process object 82.

An exemplary prototype of the global process module 70 implemented in pseudo-C programming language is given in Table 1 below:

TABLE 1

```
typedef struct global_process_struct
{
    ULONG current_processes;
    void *p_offset[maximum_number_of_processes]
    UBYTE size[maximum_number_of_processes]
    PROCESS_INITIALIZE              process_initialize;
    PROCESS_FORMAT_DISK             process_format_disk
    PROCESS_INITIALIZE_HASH_TABLE   process_initalize_hash_table;
```

TABLE 1-continued

| | |
|---|---|
| PROCESS_RECORD_MORE | process_record_more; |
| PROCESS_PLAY_MORE | process_play_more; |
| PROCESS_LOAD_DESCRIPTOR | process_load_descriptor; |
| PROCESS_STORE_DESCRIPTOR | process_store_descriptor; |
| PROCESS_DELETE_DESCRIPTOR | process_delete_descriptor; |
| PROCESS_PLAY | process_play; |
| PROCESS_RECORD | process_record; |
| } GLOBAL_PROCESS; | |

The process status monitor 72 maintains information pertaining to the activation of all current processes. In a preferred embodiment, the process status monitor 72 is implemented as an unsigned long number (32-bit number), wherein each bit of the unsigned long number corresponds to an A/V file system process. As shown in Table 1, the parameter "ULONG current_processes" corresponds to the process status monitor 72.

When a process corresponding to a given bit of the process status monitor 72 becomes active, that bit is set to one. Hence, bits corresponding to active processes are set to one, while bits corresponding to inactive processes are set to zero. Those skilled in the art will appreciate that the process status monitor 72 may be implemented via other mechanisms, such as an array or another type of number without departing from the scope of the present invention. Furthermore, a different bit assignment scheme may be employed to indicate whether a given process is active or inactive.

The pointers control 74 maintains a list of pointers each pointing to the beginning of an A/V file system process. In a preferred embodiment, the pointers control 74 is implemented in the form of an array of pointers. Each element of the array of pointers stores a pointer to an A/V file system process. Each A/V file system process is associated with a local process object. Each local process object, in turn, is assigned a dedicated memory location from which the associated A/V file system process runs. The pointers point to the dedicated memory locations. As shown in Table 1, the parameter "*p_offset[maximum_number_of_processes]" corresponds to the pointers control 74.

When a given process executes, variables for that process are stored in the corresponding dedicated memory location if a disk access or other process need to be executed to provide the requisite input. When the disk access or other process returns the requisite input to the originating process, the process retrieves the variables from its dedicated memory location via the corresponding pointer and resumes processing. The A/V file system processes may be nested such that a given A/V file system process may launch another A/V file system process, which may launch yet another A/V file system process, and so on. Furthermore, the A/V file system processes may run in parallel. Use of dedicated memory location for each process facilitates running simultaneous processes by preventing one process from destroying values of variables associated with another running process.

The process size indicator 76 maintains an inventory of size information for each A/V file system process. In a preferred embodiment, the process size indicator 76 is implemented as an array. As shown in Table 1, the parameter "UBYTE size[maximum_number_of_processes]" corresponds to the process size indicator 76.

Each local process object 78-82 contains information relating to an A/V file system process. Each local process object 78-82 includes a progress monitor 84, a callback function 86, a process phase monitor 88, and a set of application-specific process properties 90. In a preferred embodiment, the progress monitor 84, the callback function 86, the process phase monitor 88, and the set of application-specific process properties 90 are implemented as objects, such as C structures, classes, or enumerative types. As shown in Table 1, the terms process_initialize, process_format_disk, process_initialize_hash_table, process_record_more, process_play_more, process_load_descriptor, process_store_descriptor, process_delete_descriptor, process_play, and process_record correspond to A/V file system processes. Each A/V file system process is represented by a local process object with structure defined by its corresponding prototype, which is listed in capital letters in Table 1.

All A/V file system processes 92 (e.g., n processes) communicate with the process control manager 50 to update the corresponding local process objects 78-82. For illustrative purposes, A/V file system process 94 associated with the first local process object 78 are shown communicating with the first local process object 78.

An exemplary C-code prototype for the process_load_descriptor object is given in Table 2 below:

TABLE 2

```
typedef struct load_descriptor_process_struct
{
PROGRESS              progress;
CALLBACK              process_to_callback_when_done;
PROCESS_PHASE_ENUM    process_phase;
ULONG                 window_number;
ULONG                 window_remainder;
UWORD                 window_index;
UWORD                 window_position;
LBA                   logic_block_address;
ULONG                 DRAM_start_byte_address;
ULONG                 mod_position;
ULONG                 FAT_entry_position;
DESCRIPTOR_ID         descriptor_identification;
DESCRIPTOR_REQUEST    descriptor_request;
HASH_TABLE_ENTRY_LOCATION
                      hash_table_entry_location;
TRACK_TABLE_ENTRY     track_table_entry;
void                  *pointer_to_descriptor;
}PROCESS_LOAD_DESCRIPTOR;
```

The "progress" and "process_to_callback_when_done" parameters listed above correspond to the progress monitor 84 and the callback function 86, respectively. The progress monitor 84 and the callback function 86 enable each process to run in accordance with the process management method which selectively pauses, starts, and coordinates processes in accordance with the current progress of each process and callback function associated with each current process.

The callback function 86 (process_to_callback_when_done) of the above-defined process_load_descriptor object indicates the function to call back when execution of the current process is completed. Details of the callback function 86 are application-specific and may be determined by one skilled in the art based on disclosure provided herein.

An exemplary C-code prototype for the progress monitor 84 is given in Table 3 below:

TABLE 3

```
typedef enum progress_enum
{
    PROCESS_INACTIVE = 1,
    PROCESS_FIRST_CALL,
    PROCESS_GOING_ON,
    PROCESS_LAST_CALL
} PROGESS;
```

In this exemplary embodiment, each element of the progress monitor 84 corresponds to a state of a given process. The various states of a given process include an inactive state, a first-call state, a going-on state, or a last-call state.

The use of the progress monitor 84 and the callback function 86, respectively, enables the A/V file system 22 to effectively coordinate A/V file system processes and to accommodate delays between code (process) execution and disk access, which are exacerbated by large isochronous A/V files. In addition, coordination of A/V file system processes in accordance with the process control manager 50 and the corresponding process management method also enables effective handling of small asynchronous files. Hence, the A/V file system 22 is optimized for both small asynchronous files and large isochronous files.

As mentioned above, the process control manager 50 controls and monitors the local process objects 78-82 in accordance with a process management method. In accordance with the process management method, each process passes through various states and/or phases during execution. Process states include the inactive state, the first-call state, the going-on state, and the last-call state. The current state of a process is maintained in the progress monitor 84 by the associated local process object.

When a process is in a given state, the process may pass through various phases which are tracked by the process phase monitor 88. Upon completion of a given process state, the process is paused. The process waits, if necessary, until requisite input from any related external functions or processes are provided. Once the requisite input to the process is available, variables for the process are then retrieved from the corresponding dedicated memory location. The state of the process, which is stored in the progress monitor 84, is updated to the next process state or phase. The process then resumes.

Figure 4:
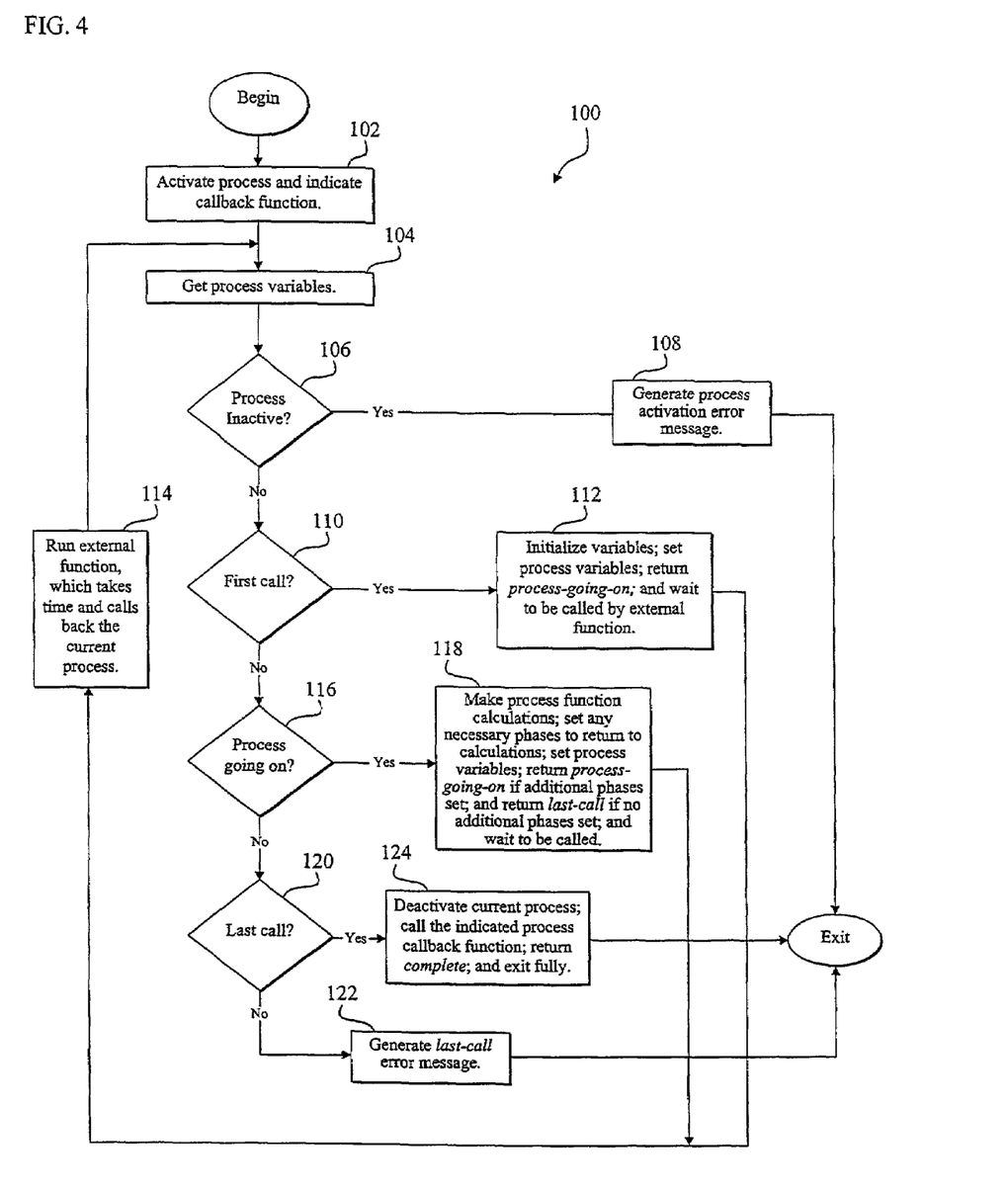
FIG. 4 is a simplified flow diagram illustrating operation of the process management method in accordance with the present invention.

FIG. 4 is a simplified flow diagram illustrating operation of the process management method in accordance with the present invention. The process management method 100 provides a framework of operating rules that enable the process control manager 50 to efficiently handle A/V file system processes.

The process management method 100 includes an initial activation step 102. When a function call is received by the A/V file system 22, the relevant process(es) needed to satisfy the function call are identified and activated. Additional process(es) may also be identified and activated as one process may need to call upon one or more other process(es) to carry out its intended function. More specifically, local process objects which correspond to the relevant process(es) are activated. In addition, a callback function associated with the function call is designated. This is performed to provide information so as to inform the function call when the relevant process(es) are completed.

In the variables-retrieving step 104, variables associated with the corresponding local process object for each currently activated process are retrieved from the dedicated memory location allocated for that process.

A first state-checking step 106 is initiated. During this step 106, the status of the current process is checked to determine if the current process is active. In the preferred embodiment as shown in FIG. 3, the corresponding bit of the process status indicator 72 is checked to determine the status of the current process.

If the current process is inactive, a first error-generation step 108 is then initiated. During this step 108, an activation error message is generated and execution of the current process is terminated. An error message is generated because at this point the current process should have an active status.

If the current process is active, then a second state-checking step 110 is initiated. During this step 110, the local process object corresponding to the current process is checked to determine if the current process is in a first-call state. A first-call state indicates that the current process is being called for the first time. If the current process is in the first-call state, then control is passed to an initialization step 112.

During the initialization step 112, variables associated with the current process are initialized and/or set. The state of the current process is set to the going-on state by updating the progress monitor 84 of the local process object corresponding to the current process. The current process is then paused and the current values of the associated variables are stored at the corresponding dedicated memory location. Control is then passed to an external function step 114.

During the external function step 114, if needed by the current process, an external function or process is called and is supplied with a callback function corresponding to the current process. The called process may take time to execute. When the execution of the called process is completed, the supplied callback function is used to inform the paused current process. For example, during the external function step 114, a disk access may be implemented, wherein information is required to be retrieved from the hard disk and provided to the current process.

When the requisite information for the paused current process is available, the variables-retrieving step 104 is initiated again to retrieve the variables for the current process from the corresponding dedicated memory location.

At this point, if the state of the current process is neither inactive nor first-call, then a third state-checking step 116 is initiated. If operations implemented by the initialization step 112 are rapid and do not require disk access, control may be passed directly to a subsequent third state-checking step 116, without departing from the scope of the present invention.

In the third state-checking step 116, the local process object which corresponds to the current process is accessed to determine if the current process is in the going-on state. If the current process is in the going-on state, then control is passed to a process calculation step 118.

In the process calculation step 118, the current process implements any necessary calculations. Some calculations may require input from other processes or functions, such as disk access processes, before resuming. Additional input may be required at various different stages during calculations. Therefore, the calculation step 118 may divide computations into several phases. During each phase, the current process is paused; control is passed to the external function step 114; and the phase is updated. The calculation step 118 also sets requisite process variables. The calculation step 118 changes the state of the current process from going-on to last-call upon completion of all phases of the going-on state. The calculation step 118 then pauses the current process, and control is passed to the external function step 114.

If the calculation step 118 did not change the state of the current process to last-call, then the calculation step 118 is repeated. The calculation step 118 then employs new values obtained via the external function step 114 to proceed to the next phase of the going-on state. Control is repeatedly passed to the calculation step 118, and the phase of the current process is updated until the calculation step 118 has finished computations associated with the last phase of the going-on state. When the last phase is complete, the calculation step 118 sets the state of the current process to last-call. Control is then passed back to the external function step 114.

After the calculation step 118 has set the state of the current process to last-call, then control is passed to a fourth state-checking step 120. In the fourth state-checking step 120, the state of the current process is checked to determine if the current process is in the last-call state. If the current process is not in the last-call state, then an error has occurred, and control is passed to a second error-generating step 122, and the current process is terminated. If the current process is in the last-call state, then control is passed to a deactivation step 124.

In the deactivation step 124, the current process is deactivated, and the process indicated in the callback function (see FIG. 3) associated with the current process is called. The process is then complete.

In the present specific embodiment, the first state-checking step 106, the second state-checking step 110, the third state-checking step 116, and the fourth state-checking step 120 are implemented in software via a C-code switch statement, wherein each state-checking step 106-120 corresponds to a case of the switch statement. Those skilled in the art will appreciate that different programming languages and different types of statements, such as if-then-else statements, may be employed to implement the method 100 without departing from the scope of the present invention.

Pseudo-code for exemplary load_descriptor function and the associated load_descriptor process are given in Table 4 below. The Load Descriptor Function described below activates and calls the associated Load Descriptor Process:

TABLE 4

PUBLIC STATUS Load Descriptor Function (input parameter list: descriptor identification, descriptor request, pointer to descriptor, pointer to callback function)
Begin Load Descriptor Function
    Initialize a status variable to failed status;
    Activate the Load Descriptor Process;
    Call the Load Descriptor Process with the parameters (descriptor identification,
        descriptor request, pointer to descriptor, pointer to callback function), and
        assign the status returned by the Load Descriptor Process to said status
        variable;
    Return the status variable;
End Load Descriptor Function
PUBLIC STATUS Load Descriptor Process (input parameter list: descriptor identification, descriptor request, pointer to descriptor, pointer to callback function)
Begin Load Descriptor
    Declare and initialize a status variable to failed status;
    Declare a callback function variable;
    Declare a process variable of type Load Descriptor;
    Retrieve process variables associated with the Load Descriptor Process from the
        corresponding process object and store the retrieved process variables via the
        declared process variable;
    Switch (progress of process), i.e., Check the state of the Load Descriptor Process by
        checking the progress variable of the Load Descriptor Process and perform the
        following based on the result:
        Begin
            Case process-inactive:
                Generate a process activation error message;
                Return the declared status variable;
            Case process-first-call:
              Perform general initializations and if required, call an external
                disk-access process or function and pause the Load
                Descriptor Process until the disk-access is complete;
              Set the progress property of the Load Descriptor Process to
                process-going-on, thereby placing the current process in
                the process-going-on state;
              Set variables associated with the Load Descriptor Process;
              Return status in progress;
            Case process-going-on:
              Run computations for the Load Descriptor Process, and
                possibly initiate disk access and pause the Load
                Descriptor Process until the disk access returns;
              Set any necessary phases required for continued computations,
                and if phases must be set:
                Begin
                    Set the phase of the Load Descriptor Process
                        to the appropriate phase and perform
                        calculations associated with the phase;
                        call external functions if needed; and
                        pause the current process at the current
                        phase until the external functions return;

TABLE 4-continued

```
                                then update the current phase resume
                                  computations;
                              If no additional phases must be set, then
                                  continue;
                        End;
                    Set the set the phase and state of the Load Descriptor Process to
                       last-call;
                    Case process-last-call:
                       Assign the declared callback function variable to the callback
                          function specified in the callback property associated
                          with the Load Descriptor Process or as specified via the
                          pointer to callback function parameter input to the Load
                          Descriptor Process;
                       Deactivate the Load Descriptor Process;
                       Invoke the callback function via the callback function variable;
                       Return status complete;
                End;
             Return the declared status variable;
          End Load Descriptor Process
```

Note that in the case process-going-on, the Load Descriptor Process is in the going-on state. While in this state, the process may call another process, which may call another process. Each call to another process changes the phase or sub-state within the going-on state until no more additional phases must be set. Upon completion of calculations and/or processes associated with the phases, the state of the process is updated to last-call. In this way, processes may be nested. Furthermore, a given function may call several processes in sequence, which may run simultaneously within the framework of the process management method 100 described above.

By employing various process states, and selectively pausing a process at a given state and/or phase within a state until required values are received by the process from an external function or process, delays between code execution and disk access can be reduced. By handling delays between code execution and disk access, the A/V file system 22 effectively accommodates large isochronous files. The process management method 100 enables the A/V file system 22 to efficiently organize process execution and optimize hard disk space utilization, which minimizes data corruption and A/V playback glitches.

The present invention has been described herein with reference to a particular embodiment for a particular application. However, it is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for managing a plurality of file system processes within an audio/video file system, comprising:
    a process status monitor for maintaining respective status information pertaining to said plurality of file system processes for processing isochronous files and asynchronous files; and
    a plurality of local process objects, each local process object having a plurality of variables stored at a dedicated location;
    wherein each local process object corresponds to a file system process;
    wherein said plurality of file system processes are executed in accordance with the respective status information pertaining to said plurality of file system processes, wherein said plurality of file system processes are paused at a point during execution according to the status information to wait for input from another process if input is needed to allow processing of isochronous files and asynchronous files; and
    wherein upon execution of each of said plurality of file system processes from being paused, said plurality of variables from the corresponding local process object is retrieved from said dedicated location.

2. The system according to claim 1 further comprising:
    a pointers control for maintaining a plurality of pointers;
    wherein said plurality of pointers respectively point to said plurality of local process objects thereby allowing said plurality of variables of each of said plurality of local process objects to be retrieved.

3. The system according to claim 1 further comprising:
    a process size indicator for maintaining size information for said plurality of file system processes.

4. The system according to claim 1, wherein said process status monitor is implemented using a bit string.

5. A system for managing a plurality of file system processes, comprising:
    a process status monitor for maintaining respective status information pertaining to said plurality of file system processes; and
    a plurality of local process objects, each local process object further comprising:
    a progress monitor configured to pause said plurality of file system processes at a point during execution according to the status information to wait for input from another process if input is needed to allow processing of isochronous files and asynchronous files;
    a callback function configured to return the input from the another process; and
    wherein each local process object corresponds to a file system process, wherein upon execution of each of said plurality of file system processes from being paused, said plurality of variables from the corresponding local process object is retrieved from said dedicated location.

6. The system according to claim 5, wherein said progress monitor is used to maintain state information for said file system process.

7. The system according to claim 6, wherein said state information includes an inactive state, a first-call state, a going-on state, and a last-call state.

8. The system according to claim 5, further comprising:

a process phase monitor;

wherein said process phase monitor is used to maintain phase information for said file system process.

9. A process control manager for managing a plurality of file system processes within an audio/video file system, comprising:

a global process module having:

a process status monitor for maintaining respective status information relating to said plurality of file system processes;

a plurality of local process objects, each local process object having a progress monitor, a callback function, and a set of application specific process properties, wherein said plurality of file system processes are paused at a point during execution according to the status information to wait for input from another process if input is needed to allow processing of isochronous files and asynchronous files;

a pointers control for maintaining a plurality of pointers, each pointer pointing to one of said plurality of local process objects; and a process size indicator for maintaining size information for said plurality of file system processes.

10. The process control manager according to claim 9, wherein each local process object further includes a plurality of variables stored at a dedicated location;

wherein each local process object corresponds to a file system process; and wherein upon execution of said file system process, said plurality of variables from said corresponding local process object is retrieved from said dedicated location.

11. The system of claim 1, wherein said plurality of file system processes progress through a plurality of states, wherein said plurality of file system processes may be paused at an end of one of the states.

12. The system of claim 11, wherein within each state, said plurality of file system processes may progress through a plurality of phases, wherein said plurality of file system processes may be paused at an end of one of the phases.

13. The system of claim 12, wherein the plurality of states and phases specify points where said plurality of file system processes may need input from another process to allow processing of both isochronous and asynchronous files.

14. The system of claim 5, wherein said plurality of file system processes progress through a plurality of states, wherein said plurality of file system processes may be paused at an end of one of the states.

15. The system of claim 14, wherein within each state, said plurality of file system processes may progress through a plurality of phases, wherein said plurality of file system processes may be paused at an end of one of the phases.

16. The system of claim 15, wherein the plurality of states and phases specify points where said plurality of file system processes may need input from another process to allow processing of both isochronous and asynchronous files.

17. The system of claim 9, wherein said plurality of file system processes progress through a plurality of states, wherein said plurality of file system processes may be paused at an end of one of the states.

18. The system of claim 17, wherein within each state, said plurality of file system processes may progress through a plurality of phases, wherein said plurality of file system processes may be paused at an end of one of the phases.

19. The system of claim 18, wherein the plurality of states and phases specify points where said plurality of file system processes may need input from another process to allow processing of both isochronous and asynchronous files.

* * * * *